(12) United States Patent
Dodrill et al.

(10) Patent No.: US 6,697,964 B1
(45) Date of Patent: Feb. 24, 2004

(54) HTTP-BASED LOAD GENERATOR FOR TESTING AN APPLICATION SERVER CONFIGURED FOR DYNAMICALLY GENERATING WEB PAGES FOR VOICE ENABLED WEB APPLICATIONS

(75) Inventors: Lewis Dean Dodrill, Richmond, VA (US); Narasimha Nayak, Glen Allen, VA (US); Ryan Alan Danner, Glen Allen, VA (US); Steven J. Martin, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/534,121

(22) Filed: Mar. 23, 2000

(51) Int. Cl.$^7$ .................................................. G06F 11/00
(52) U.S. Cl. .......................... 714/38; 709/200; 709/203; 709/217
(58) Field of Search ........................... 714/38; 709/203, 709/200, 223, 217, 513; 707/1, 10, 513; 370/352, 428; 713/201; 705/35, 51

(56) References Cited

U.S. PATENT DOCUMENTS

| | | | | |
|---|---|---|---|---|
| 5,940,472 A | * | 8/1999 | Newman et al. | 379/10.02 |
| 5,974,443 A | * | 10/1999 | Jeske | 709/202 |
| 6,119,247 A | * | 9/2000 | House et al. | 714/38 |
| 6,181,691 B1 | * | 1/2001 | Markgraf et al. | 370/352 |
| 6,269,330 B1 | * | 7/2001 | Cidon et al. | 714/43 |
| 6,314,402 B1 | * | 11/2001 | Monaco et al. | 704/275 |
| 6,353,608 B1 | * | 3/2002 | Cullers et al. | 370/352 |
| 6,456,699 B1 | * | 9/2002 | Burg et al. | 379/88.17 |
| 6,490,564 B1 | * | 12/2002 | Dodrill et al. | 704/275 |

OTHER PUBLICATIONS

Microsoft Press Computer Dictionary, 1997, Microsoft Press, Third Edition, pp. 422, 423 and 461.*
Gladstone, "testing Computer–Telephony Systems and Networks", 1$^{st}$. Ed., Flatiron Publishing, Inc., Sep. 1994, pp. 51–59.

* cited by examiner

Primary Examiner—Robert Beausoliel
Assistant Examiner—Michael Maskulinski
(74) Attorney, Agent, or Firm—Leon R. Turkevich

(57) ABSTRACT

A testing system for an application server configured for providing a unified web-based voice messaging system using voice application control between a web browser via an hypertext transport protocol (HTTP) connection. The testing system is configured for outputting HTTP-based application-specific requests to the application server based on execution of prescribed scripts that specify generation of the application-specific requests according to the state-aware application. Each script specifies parameters for a prescribed sequence of requests for a prescribed application operation for the application server, enabling the load generator to provide a sequence of requests, simulating the sequence of requests that would normally be sent by a user of the application server during a user application session. The testing system also includes a HTTP-based user interface that enables a user to select the scripts, as well as the number of instances for simultaneous execution of the selected number of iterations.

35 Claims, 6 Drawing Sheets

```
<HTML>
<HEAD>
<TITLE> Hello </TITLE>
<BODY>
        <FORM>
40 ⟶          (Form contents)
        </FORM>
32 ⟶ <EMBED file="http://server/wavdirectory/wavfile.wav" autostart = true>
      <XML>
           <PROMPTLIST>
36              <PROMPT type="wav" name="wavurl1"/>
                <PROMPT type="wav" name="wavurl2"/>
34 ⟶      </PROMPTLIST>
           <RECORD upload = "upload URL"
38                 filename = "local filename to use"
                   maxlength = "maximum record length"
           />
      </XML>
</HTML>

</body>
</htm1>
```

```
Leavemsg script:
[PARAM]
CallType         = B
LocalNumber      = 8045559999
RemoteNumber     = 8049990000
ForwardedNumber  = 8035550000(+10)
iterations       = 10
PIN              = 4321

[SCRIPT]
SLEEP = [14-16]
EXEC  = RECORD
SLEEP = 2

POST  = #
SLEEP = 3
POST  = 1
SLEEP = 3
POST  = *9
SLEEP = [3-5]
SET = param{ForwardedNumber}(+1)
```

Figure 3A

```
Getmsg script:
[PARAM]
CallType         = D
LocalNumber      = 8045559999
RemoteNumber     = 8035550000(+10)
ForwardedNumber  =
iterations       = 10
PIN              = 4321

[SCRIPT]
POST  = param{RemoteNumber}(+1)

SLEEP = 1
POST  = param{PIN}
SLEEP = 2
POST  = 1
SLEEP = 1
POST  = 1
SLEEP = [10-12]
POST  = 3
SLEEP = 3
POST  = *9
SLEEP = 3
```

Figure 3B

Script: leave.scp

| ID | Attempts | Competed | No Confirm | Menu Resp | Record Resp | Iteration Length | Time Elapsed |
|---|---|---|---|---|---|---|---|
| ch_0 | 190 | 190 | 0 | 0.176 | 0.104 | 28.490 | 5413.165444 |
| ch_1 | 190 | 190 | 0 | 0.181 | 0.103 | 28.444 | 5404.507267 |
| ch_10 | 189 | 189 | 0 | 0.176 | 0.103 | 28.411 | 5369.766236 |
| ch_11 | 187 | 187 | 0 | 0.182 | 0.104 | 28.662 | 5359.94718 |
| ch_2 | 189 | 189 | 0 | 0.180 | 0.103 | 28.570 | 5399.841653 |
| ch_3 | 189 | 189 | 0 | 0.176 | 0.102 | 28.504 | 5387.478617 |
| ch_4 | 190 | 190 | 0 | 0.178 | 0.100 | 28.450 | 5405.69873 |
| ch_5 | 189 | 189 | 0 | 0.180 | 0.100 | 28.510 | 5388.459568 |
| ch_6 | 189 | 189 | 0 | 0.178 | 0.106 | 28.430 | 5373.35637 |
| ch_7 | 188 | 188 | 0 | 0.180 | 0.099 | 28.561 | 5369.691437 |
| ch_8 | 189 | 189 | 0 | 0.176 | 0.105 | 28.391 | 5366.116816 |
| ch_9 | 189 | 189 | 0 | 0.176 | 0.103 | 28.480 | 5382.880638 |
| SUMMARY | 2268 | 2268 | 0 | 0.17825 | 0.10266666666667 | 28.49191666666667 | 5413.165444 |

Script: getmsg.scp — 110b

| ID | Attempts | Competed | No Confirm | Menu Resp | Record Resp | Iteration Length | Time Elapsed |
|---|---|---|---|---|---|---|---|
| ch_0 | 239 | 239 | 0 | 0.292 | 0.000 | 23.116 | 5524.919349 |
| ch_1 | 238 | 238 | 0 | 0.289 | 0.000 | 23.128 | 5504.702873 |
| ch_10 | 237 | 237 | 0 | 0.294 | 0.000 | 23.069 | 5467.63137 |
| ch_11 | 237 | 237 | 0 | 0.291 | 0.000 | 23.054 | 5463.924583 |
| ch_2 | 238 | 238 | 0 | 0.289 | 0.000 | 23.103 | 5498.797612 |
| ch_3 | 233 | 233 | 0 | 0.307 | 0.000 | 23.608 | 5500.716682 |
| ch_4 | 238 | 238 | 0 | 0.291 | 0.000 | 23.096 | 5496.951639 |
| ch_5 | 239 | 239 | 0 | 0.284 | 0.000 | 23.020 | 5502.06063 |
| ch_6 | 238 | 238 | 0 | 0.288 | 0.000 | 23.073 | 5491.575028 |
| ch_7 | 238 | 238 | 0 | 0.290 | 0.000 | 23.084 | 5494.263885 |
| ch_8 | 236 | 236 | 0 | 0.293 | 0.000 | 23.205 | 5476.578796 |
| ch_9 | 237 | 237 | 0 | 0.293 | 0.000 | 23.090 | 5472.600325 |
| SUMMARY | 2848 | 2848 | 0 | 0.2915 | 0 | 23.13716666667 | 5524.919349 |

Test Summary — 112

| ID | Attempts | Competed | No Confirm | Menu Resp | Record Resp | Iteration Length | Time Elapsed |
|---|---|---|---|---|---|---|---|
| SUMMARY | 5116 | 5116 | 0 | 0.234875 | 0.05133333333333 | 25.81454166667 | 5524.919349 |

114, 116, 118, 120, 122, 124, 126, 128

HTTP-BASED LOAD GENERATOR FOR TESTING AN APPLICATION SERVER CONFIGURED FOR DYNAMICALLY GENERATING WEB PAGES FOR VOICE ENABLED WEB APPLICATIONS

BACKGROUND OF THE INVENTION

1. Field of the Invention

The present invention relates to testing of web-based application servers configured for generating web pages for voice enabled web applications within a hypertext markup language (HTML) and hypertext transport protocol (HTTP) framework.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions. In addition, the web server may provide logging and monitoring capabilities.

In contrast to the public switched telephone network, the open standards-based IP network has enabled the proliferation of web based applications written by web application developers using ever increasing web development tools. Hence, the ever increasing popularity of web applications and web development tools provides substantial resources for application developers to develop robust web applications in a relatively short time and an economical manner. However, one important distinction between telephony-based applications and web-based applications is that telephony-based applications are state aware, whereas web-based applications are stateless.

In particular, telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

Commonly-assigned, copending application Ser. No. 09/480,485, filed Jan. 11, 2000, entitled Application Server Configured for Dynamically Generating Web Pages for Voice Enabled Web Applications the disclosure, of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Rigorous testing of new technologies is important to ensure quality and reliability of products during commercial deployment. The above-described application server disclosed in the above-incorporated application Ser. No. 09/480,485 could be tested using conventional test tools such as web server benchmarks, standard web browsers, or telephony load generation tools. None of these existing test tools, however, can test application features or effectively isolate the performance of the application server in preparation for commercial deployment. For example, conventional web server benchmarks, configured for testing response times to multiple iterations of the same request from web clients, are not designed for testing an application server executing a state-aware application such as a voice application in response to different requests. In addition, conventional telephony load generation tools configured for testing telephony devices are inadequate in testing the above-described application server, since use of such telephony load generation tools would necessitate use of a proxy browser, described in the above-incorporated application Ser. No. 09/480,485, as an interface between the application server and the telephony load generation tools. Consequently, the use of a proxy browser between the telephony load generation tools and the application server limits the ability to isolate the performance of the application server, since any detected problem may be caused by any one of the application server, the proxy browser, or the associated communication links.

SUMMARY OF THE INVENTION

There is a need for an arrangement that enables precise testing of an HTTP-based application server configured for executing voice applications on an IP packet switched network.

There is also a need for an arrangement that enables an HTTP-based application server, configured for executing voice applications on an IP network, to be tested for application-specific features or events, such as application features found in voice-enabled voice applications.

There is also a need for an arrangement that enables web-based control of testing of an HTTP-based application server, configured for executing voice applications on an IP network, including execution of selected tests, gathering test results including test statistics, and displaying the test results on a web browser.

These and other needs are attained by the present invention, where an HTTP-based load generator is configured for outputting HTTP-based application-specific requests to an application server, configured for executing a state-aware application, based on execution of prescribed scripts that specify generation of the application-specific requests according to the state-aware application. Each script specifies parameters for a prescribed sequence of requests for a prescribed application operation for the application server, enabling the load generator to provide a sequence of requests, simulating the sequence of requests that would normally be sent by a user of the application server during a user application session.

One aspect of the present invention provides a method in an executable system for testing an application server configured for executing a voice web application by sending responses to requests via a Hypertext Transport Protocol (HTTP) connection. The method includes executing at least one selected script from a plurality of scripts, each script configured for specifying parameters for a prescribed sequence of requests for the voice web application. The method also includes outputting, to the application server via the HTTP connection, the prescribed sequence of requests based on execution of the corresponding selected one script. Execution of a selected script enables testing of a corresponding set of voice web application operations by the application server, where the prescribed sequence of requests emulate the HTTP requests normally sent by an HTTP-based browser. Hence, the application server can be tested to ensure each voice web application operation is executed properly by executing the corresponding selected script. In addition, execution of the selected script enables the executable system to generate multiple instances of the selected script, each instance capable of outputting the prescribed sequence of requests for a prescribed number of iterations. Hence, the application server can be tested for loading conditions based on the number of concurrently-executed instances, and long-term performance based on the number of iterations (e.g., over days or weeks) within each instance.

Another aspect of the present invention provides a system configured for testing an application server configured for executing a voice web application. The system includes a storage medium for storing scripts, each script configured for specifying parameters for a prescribed sequence of requests for the voice web application. The system also includes an executable runtime environment configured for selectively executing at least one of the scripts, the executable runtime environment outputting, to the application server via a Hypertext Transport Protocol (HTTP) connection, the prescribed sequence of requests based on execution of the corresponding selected one script.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 2 is a diagram illustrating an HTML page dynamically generated by the application server and having XML voice application control content for a web browser.

FIGS. 3A and 3B are diagrams illustrating scripts executable by the test system of FIG. 1 for generation of requests to test execution of the voice web application by the application server.

FIGS. 5A, 5B and 5C are diagrams illustrating statistics generated by the test system of FIG. 1 for evaluation of the voice-enabled application server.

BEST MODE FOR CARRYING OUT THE INVENTION

Figure 1:
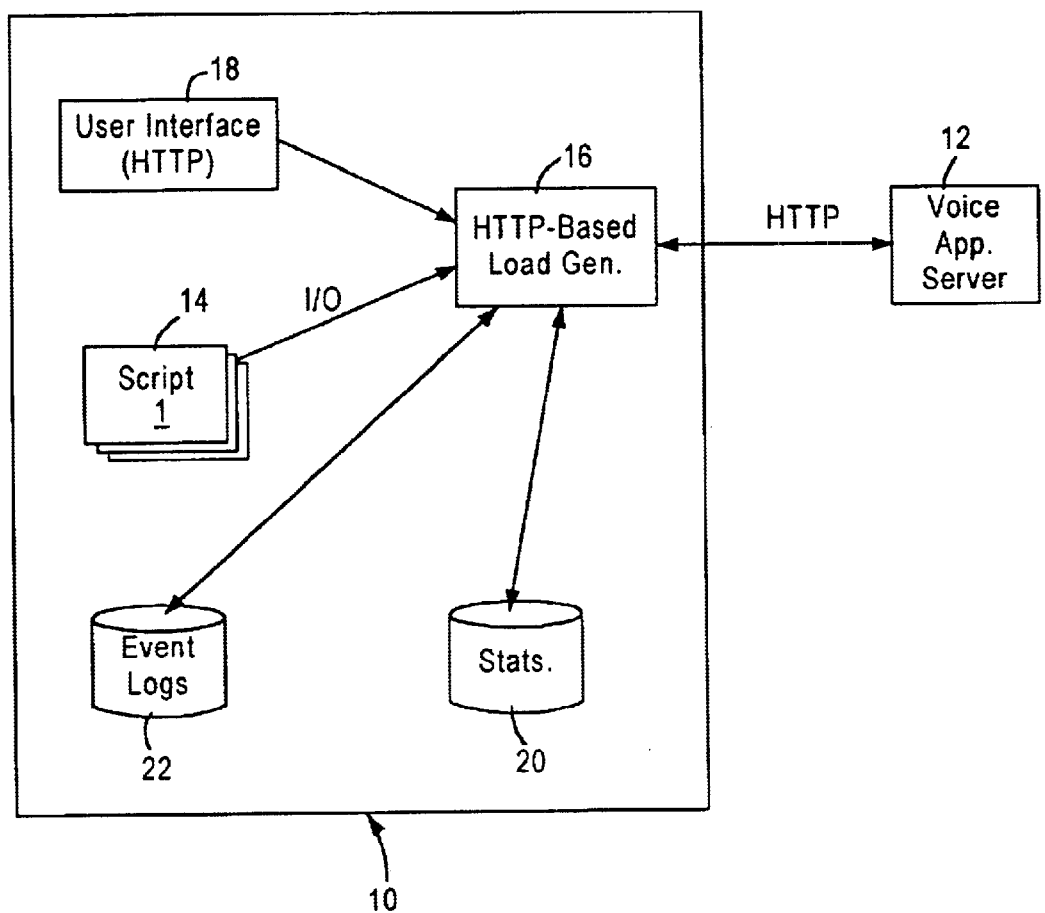
FIG. 1 is a block diagram illustrating a system for testing a voice-enabled application server across an HTTP connection according to an embodiment of the present invention.

FIG. 1 is a block diagram illustrating a system 10 for testing an HTTP-based voice application server 12 according to an embodiment of the present invention. The application server 12, described in detail in the above-incorporated application Ser. No. 09/480,485, is configured for responding to requests (i.e., client requests) from proxy browsers and web browsers that send voice application requests. In particular, the application server 12 provides an executable runtime environment for execution of voice applications defined by XML documents. In response to reception of a client request, the application server 12 accesses a selected XML document, and dynamically generates a hypertext markup language (HTML) document having XML tags for audio control by a voice resource within the browser; the application server 12 may also perform processing and return a calculated value to enable the client to perform additional processing.

Hence, the application server 12 executes voice web applications for responding to client requests, enabling a client such as a proxy browser to provide a user with the perception of an interactive voice mail type session with the application server 12. Additional details of the application server 22 and execution of XML documents for generation of voice-enabled web applications are disclosed in the above-incorporated application Ser. No. 09/480,485, filed Jan. 11, 2000, entitled Application Server Configured for Dynamically Generating Web Pages for Voice Enabled Web Applications.

According to the disclosed embodiment, the testing system 10 is configured for outputting HTTP-based application-specific requests to the application server 12. In particular, the testing system 10 includes a plurality of scripts 14, stored on a storage medium, each configured for specifying parameters for a prescribed sequence of requests for a voice web application executable by the application server 12. The system 10 includes an HTTP-based load generation system 16 that provides an executable runtime environment for selected execution of the scripts 14; the load generation system 16 may be implemented, for example, as a server executing a PHP hypertext processor with XML parsing and processing capabilities, available open source at http://www.php.net. The system 10 also includes an HTTP-based user interface 18 configured for supplying a user request, input by a user, to the load generator 16. For example, the user interface 18 may supply to the load generator 16 a Uniform Resource Locator (URL) address that specifies one of the scripts 14, as well as the number of instances to be simultaneously executed by the load generator 16 and the number of iterations per instance, described below. Alternately, the user interface 18 may display to the user a forms-based menu that enables the user to select a script, the number of instances to be simultaneously executed, and the number of iterations per instance.

The testing system 10 also includes a first logging system 20 configured for storing statistics of various metrics used by the load generator 16 to measure performance of the application server 12, described in further detail below with respect to FIGS. 5A, 5B, and 5C. The testing system 10 also includes a second logging system 22 configured for storing event logs (e.g., trace logs) at prescribed intervals during execution of the prescribed scripts, for example on a periodic basis such as once an hour, or on an exception basis such as when a selected one of the statistics reaches a prescribed threshold, indicating a problem in the application server 12.

The testing system 10 is configured for simulating client traffic that normally would be encountered by the application server 12 during deployment. In particular, the testing system 10 is configured for loading the application server 12 with multiple user sessions along respective virtual channels, described below, wherein each virtual channel is controlled by an instance within the runtime environment of the load generator 16 executing at least one of one of the scripts 14. Hence, the total number of instances that independently generate requests for the application server 12 simulate a group of users, for example 100 to 200 users, that may simultaneously access the application server 12 for respective user sessions.

In addition, each instance may execute a series of scripts, each having a corresponding prescribed sequence of requests for the application server 12, repeatedly for a prescribed number of iterations or over a prescribed time interval to test the long-term reliability of the application server 12. For example, the load generator 16 may execute 100 instances, where fifty instances execute a leave message script, and fifty instances execute a get message script. In addition, each of the 100 instances may repeat execution of the scripts for a prescribed number of iterations (e.g., one million iterations), or a prescribed time interval (e.g., six weeks). Hence, the application server 12 in this example would encounter across 100 virtual channels 50 simultaneous sequences of requests associated with leaving a message, followed by 50 simultaneous requests for retrieving a message, for up to one million iterations or a time interval of six weeks as specified by the user.

Hence, the load generator 16 can test the capacity of the application server based on the number of instances, the functionality of the application server 12 based on the selected scripts, and the long-term reliability of the application server 12 based on the repeated iterations specified by the user request.

Each of the scripts 14 is configured for specifying parameters to be used for generation of a prescribed sequence of requests for performance of a prescribed voice web application operation by the application server 12, for example leaving a message, or retrieving a message. In particular, each script specifies parameters used by the load generator 16 in generating a sequence of requests for the voice web application, wherein each request represents an actual request that may be sent by a browser for a corresponding user. The load generator 16 monitors for the reception of a response to the request, typically in the form of an HTML page having XML tags that specifies media content and/or control information.

FIG. 2 is a diagram illustrating a web page 30 generated by the application server 12 for a browser. The XML tags within the web page 30 typically include XML directives that specify, for example, prompts to play, input patterns to match (e.g., (0-9, *0-*9, #, etc.)), and optionally timeout parameters and record control. As shown in FIG. 2, the web page 30 may include a standard embed tag 32 in HTML format, and an in line XML portion 34 that includes media control information, such as a prompt list 36 and control information 38 for a record operation to be performed by an XML aware plug-in resource within a browser.

For example, the prompt list 36 specifies an audio file "wavfile.wav" to be played by the browser, for example as a welcome greeting. If the plug-in resource in the browser is XML control aware, then the XML aware audio resource fetches the audio files from the application server 12 at the locations "wavurl2," and "wavurl2" for playback in the prescribed sequence. For example, the XML aware audio resource plays a "Good Morning" prompt in response to receiving the .wav file from wavurl1 and "Enter Your Phone Number followed by the Pound (#) Key" prompt in response to receiving the .wav file from wavurl2, while waiting for an input pattern ([0-9] {7,9}#). This exemplary pattern ([0-9] {7,9}#) specifies to the XML aware audio resource that a valid input is composed of any string of the characters 0 through 9 for a length of 7 to 9 digits, followed by a pound key. The XML aware audio resource continues to play the audio files in the prescribed sequence while waiting for the user to input a key entry. The browser matches the user input to the input pattern, and posts the data to the voice application URL. If a record operation is pending, the audio resource begins recording, for example by playing a tone to signal the user to begin speaking. The audio resource continues to record until a timeout occurs (e.g., 30 seconds), or the user enters a key indicating recording should be halted. The browser can then "quietly" post the recorded audio file to the "upload URL" specified in the record tag 38, and then post the user input (e.g., as specified in the HTML form 40) to another URL specified within the HTML form 40.

As described below, each script 14 includes parameters necessary to generate a series of requests in a prescribed sequence that match the requests that are expected by the application server 12.

FIGS. 3A and 3B are diagrams illustrating a leave message script 14a and a get message script 14b that are executed (i.e., interpreted) by the load generator 16 in generating a prescribed sequence of requests for the corresponding voice web application operation. In particular, the load generator 16 may receive a user request from the user interface 18 requesting multiple instances each executing in sequence the leave message script 14a followed by the get message script 14b.

Each script 14 includes a parameters section 50 and a script section 52. The parameters section 50 includes parameters used by the corresponding instance of the load generator 16 in generating the HTTP requests to the application server 12. For example, the application server 12 may execute XML-enabled voice applications that expect to receive within one of the requests in the sequence a call type value 54, a local number value 56, a remote number value 58, a forwarded number value 60, and/or a PIN value 64. The parameters section 50 may also include an iteration value 62 that specify the number of times that an increment counter can be incremented by an instance within each subsequent script iteration before resetting the increment counter.

The call type parameter value 54 is a test parameter that simulates the type of phone call to be processed: for example, the value "D" simulates a direct dial to a voice mail type system, the value "B" simulates a forwarded call from a busy line, and the value "A" simulates other forwarded calls, for example due to a no answer condition or a do not disturb condition. The call type parameter value 54 may be used by the application server 12 to determine what type of greeting to output back to the requesting source (in this case the load generator 16) in the form of a .wav file.

The local number field 56 is a test parameter that simulates the number being dialed by the user, for example the telephone number used for accessing the voice mail application executed by the application server 12.

The remote number field 58 is a test parameter that simulates the number or the phone from which the call originated. The forwarded number field 60 is an optional number for representing a forwarded call to local number from another number.

A particular feature of the script 14 is that certain parameters may be incremented based on the instance number or iteration number. For example, the remote number field 58b and the forwarded number field 60a each include an instance increment parameter 66 that specifies an increment value for each instance of the script. The instance increment parameter 66, in conjunction with the iteration value 62, enables each instance to have a prescribed range of values during repeated execution iterations. For example, the instance "leavemsg0" would generate forwarded numbers within the range "8035550000" to "8035550009", the instance "leavemsg1" would generate forwarded numbers within the range "8035550010" to "8035550019", the instance "leavemsg2" would generate forwarded numbers within the range "8035550020" to "8035550029", etc.; similarly, the instance "getmsg)" would generate remote numbers within the range "8035550000" to "8035550009", the instance "getmsg1" would generate remote numbers within the range "8035550010" to "8035550019", the instance "getmsg2" would generate remote numbers within the range "8035550020" to "8035550029", etc.

As described below, one operation of the get message script 14b is to delete the voice message left by the leave message script 14a; hence, the parameters section 50b points the instances getmsg0–getmsg49 to the same fifty mailboxes having received messages from the instances leavemsg0–leavemsg 49, enabling the 100 instances to repeatedly test storage, retrieval, and deletion of a message in fifty mailboxes managed by the application server 12 without overflowing a mailbox.

Hence, the parameters portion 50 includes parameters, also referred to as call processing parameters, that may be necessary by the voice applications executed within the application server 12 to determine what type of response to send back to the requestor in the form of an HTML page, as illustrated in FIG. 2.

The script portion 52 includes script elements 70, each specifying a corresponding request to be generated and sent to the application server 12 for the corresponding application operation. For example, the script 14a includes script elements $70a_1$ to $70a_{10}$, each arranged in a prescribed sequence that results in generation of a corresponding request in the appropriate sequence to the application server.

For example, the attributes CallType 54a and LocalNumber 56a simulate a real-world phone call to a busy phone number that has forwarded the calling party to the voice messaging number managed by the application server 12. The script element $70a_1$ "sleep" corresponds to a wait interval within the range of 14 to 16 seconds, simulating for example the time interval when a user records a voice message. The script element $70a_2$ causes the corresponding instance executed by the load generator 16 to post a prescribed audio file (e.g., a .wav file) stored within the system 10 to a prescribed URL. The script element $70a_3$ then specifies waiting for two seconds, followed by the script element $70a_4$ representing posting by the instance of the pound symbol to the application server 12, normally entered by a user to stop recording. The script element $70a_5$ represents waiting three seconds while a prompt is played for the user, and the script element $70a_6$ represents the posting of a "1" by the instance to confirm that the user wants to leave the message. The script element $70a_7$ represents waiting three seconds while another prompt is played for the user, and the script element $70a_8$ represents the posting of a "*9" by the instance to end the call, followed by waiting another 3–5 seconds by the script element $70a_9$ before repeating another iteration of the script by the instance after incrementing the parameter "ForwardedNumber" parameter by the script element $70a_{10}$.

Similarly, the script elements $70b_1$ through $70b_{13}$ specify the sequence of instructions to be output for retrieving a message from the application server 12. Hence, the load generator 16 executes the script element $70b_1$ by incrementing the parameter "RemoteNumber" during each iteration, and posting to the application server 12 the parameter "RemoteNumber". The script element $70b_2$ represents the user waiting two seconds while listening to the password prompt, and the script element $70b_3$ causes the instance to post to the application server 12 a prescribed PIN value to log in. The script element $70b_4$ representing two seconds while waiting for a menu prompt, and the script element $70b_5$ causes the instance to post a "1" to select a message menu. The script element $70b_6$ represents the user waiting two seconds while listening to the message menu prompt, and the script element $70b_7$ causes the instance to post a "1" to select voice messages. The script element $70b_8$ causes the instance to wait 10 to 12 seconds to simulate listening to the voice message, and the script element $70b_9$ causes the instance to post a "3" to delete the message. The script element $70b_{10}$ causes the instance to wait three seconds, and the script element 70b₁₁ causes the instance to post a "*9" to end the call, followed by the script element 70b₁₂ causing the instance to wait three seconds before repeating another iteration.

Hence, the load generator 16 generates multiple requests to the application server 12, giving the appearance to the application server 12 of multiple independent users requesting selected application operations. As shown with respect to FIGS. 3A and 3B, the script 14 can be written to ensure that multiple messages may be repeatedly stored, retrieved, and deleted from the application server 12 without overflowing a mailbox.

If desired, the scripts 14 may also include an "expect" parameter, where the load generator 16 parses the response received from the application server 12 to determine whether the appropriate response was sent. Hence, the load generator 16 may monitor not only the performance of the application server in terms of receiving a response within a determined time interval, but also whether the correct response was supplied by the application server 12.

Figure 4:
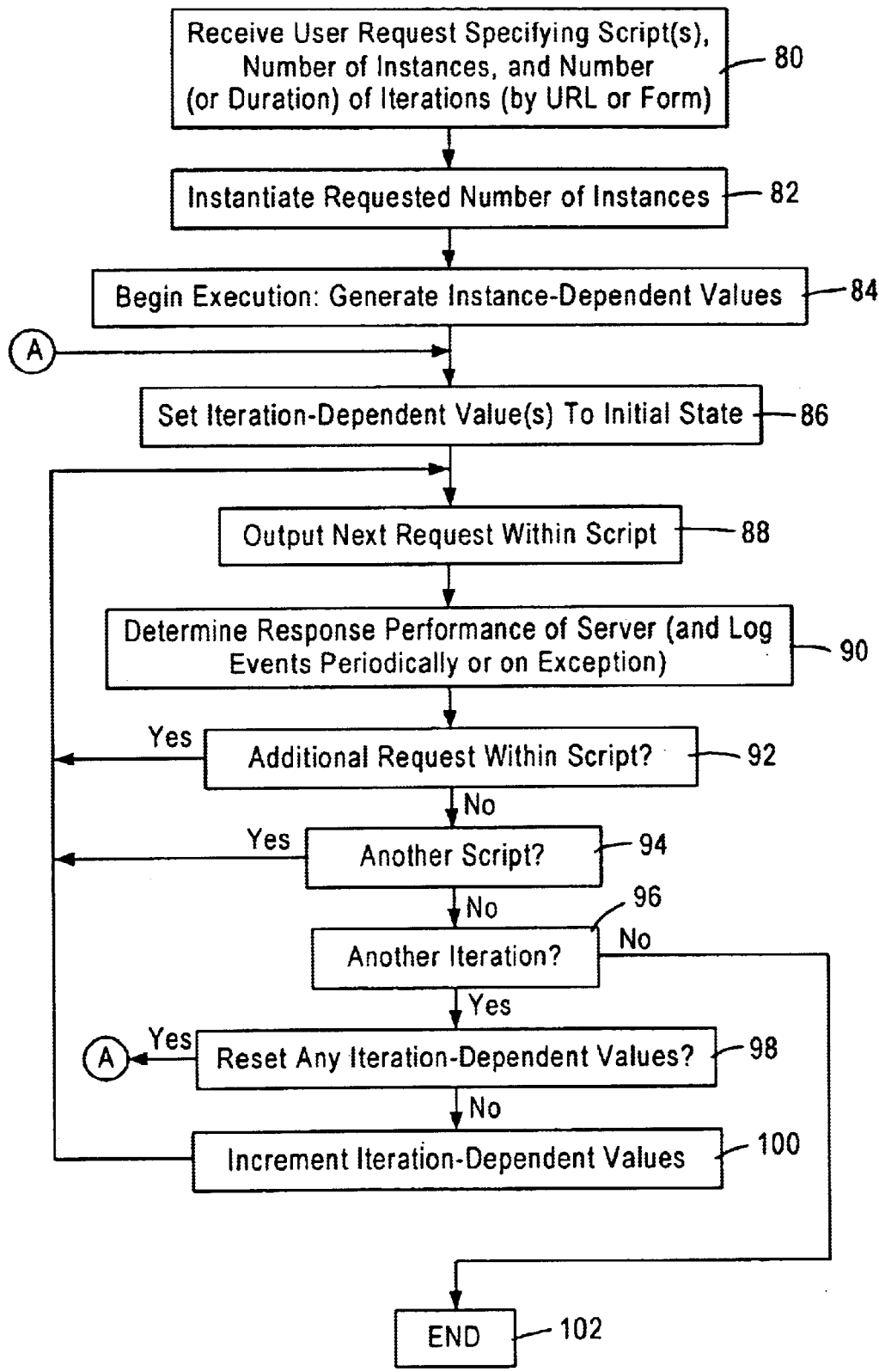
FIG. 4 is a flow diagram illustrating the method of testing the application server according to an embodiment of the present invention.

FIG. 4 is a diagram illustrating a method for testing the application server 12 according to an embodiment of the present invention. The steps described in FIG. 4 can be implemented as executable code that is stored on a computer readable medium (e.g., a hard disk drive, a floppy drive, a random access memory, a read only memory, an EPROM, a compact disk, etc). In this case, the executable code corresponds to the runtime environment within the load generator 16 that interprets and executes the scripts 14.

The method begins in step 80, where the load generator 16 receives the user request from the user interface 18. As described above, the user request specifies the scripts to be executed, the number of instances to be executed, and the number of iterations or the duration of the iterations to be repeated. The load generator 16 then instantiates in step 82 the requested number of runtime instances for execution of the selected scripts. Each instance initiated by the the load generator 16 then begins execution of the scripts by first generating in step 84 the instance-dependent values, for example as specified by the increment parameters 66 described above with respect to FIGS. 3A and 3B. If necessary, the iteration-dependent values are reset to an initial state in step 86 based on the iterations parameter 62.

Each instance initiated by the load generator 16 then generates and outputs in step 88 the next request specified by the corresponding script element 70 within the sequence. Each instance monitors the corresponding response by the application server 12 in step 90, and logs the results in the databases 20 and 22, described in further detail below with respect to FIG. 5. Each instance within the load generator 16 then checks in step 92 whether there is another script element 70 for generation of another request; if there is another script element 70, then the corresponding request is generated by the instance in step 88.

If there is no other script element 70 and if in step 94 there is no other script 14 to be executed within the sequence, the executable instance within the load generator 16 determines in step 96 whether another iteration of the selected scripts 14 should be executed based on the user-specified number (or duration) of iterations. Assuming at least another iteration is to be executed, the corresponding instance of the load generator 16 checks the iterations field 62 to determine in step 98 whether any of the iteration-dependent values should be reset. If the iteration values are less then the values of the iterations field 62, the corresponding instance in the load generator 16 increments the iteration-dependent values in step 100 (e.g., script elements 70a₄ and 70b₁)and resumes outputting the next request in step 88. If in step 96 there is no other iteration to be executed, then the testing process ends in step 102.

FIGS. 5A, 5B and 5C are diagrams illustrating respective test results 110a, 110b, and 112 generated by the load generator 16 and stored in the database 20 in step 90 of FIG. 4. The test results 110a and 110b are configured for storing statistical information of selected metrics used to identify the performance of the application server 12 for respective voice application operations. For example, the test results 110a are configured for storing the statistical information for the performance metrics of the leave message script 14a on a per-instance basis, and the test results 110b are configured for storing the statistical information for the performance metrics of the object message script 14b on a per-instance basis. The test results 112 illustrate the test summary for all scripts executed by all the instances.

Each of the test results 110 and 112 include an identifier field 114, an attempt field 116, a completed field 118, a no-confirm field 120, a menu response field 122, a record response field 124, an iteration length field 126, and a time elapsed field 128. The identifier field 114 specifies the instance identifier for a corresponding virtual channel, or else specifies that the results are a summary. The attempt field 116 specifies the number of attempts (i.e., request iterations) for the selected script that were executed by the corresponding instance, and the completed field 118 specifies the number of valid responses that were returned by the application server 12. The no-confirm field 120 specifies the number of script iterations that were not fully completed by the application server 12.

The remaining test response fields measure elapsed time in seconds. For example, the menu response field 122 specifies the average response time for a menu interaction with the application server 12: a typical measured response time (e.g., 0.225 seconds) would be the time between the load generator 16 sending the application server 12 a simulated user input of "2" at a menu, and the load generator 16 receiving a response from the application server 12. The record response field 124 specifies the average response time for a recorded file (e.g., a .wav file containing a recorded voice mail type message) to be uploaded from the corresponding instance in the load generator 16 to the application server 12. The iteration length field 126 specifies the average duration of the script portion 52 of the executed script, including all the wait states. Finally, the time elapsed field 128 measures the total time that the script has been executed by the corresponding instance.

Hence, the HTTP-based load generator 16 is configured for generating and storing the test results 110 and 112 in the statistics database 20, and updating the statistics during execution of the selected scripts, enabling a test engineer to monitor via the user interface 18 the long-term performance of selected voice application operations by the application server 12 on a per-channel basis. In addition, the test results 110 and 112 may be periodically stored as static files or in response to a detected event such as a failure, enabling a test engineer to obtain a running history of the statistics over time. If desired, the load generator 16 may also output an event log, also referred to as a trace log, to the reports database 22 at periodic intervals, for example on an hourly basis, or if a selected one of the statistical parameters in the test results 110 or 112 exceed a prescribed threshold. Hence, a test engineer can compare the trace log to the test results 110 and 112 saved at the corresponding event.

According to the disclosed embodiment, application-specific operations for voice-enabled web applications may be tested for loading capacity and long-term reliability by execution of selected scripts within an HTTP-based load generator configured for executing a user-selectable number of instances. The testing by the load generation system 10 eliminates the necessity for any telephony components or intermediate components that may introduce unknown variables to the testing system. Since the HTTP link between the test system 10 and the application server 12 can be precisely controlled, the disclosed test system enables precise performance monitoring of the application server during execution of the voice-enabled web applications.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an executable system for testing an application server configured for executing a voice web application by sending responses to requests via a Hypertext Transport Protocol (HTTP) connection, the method comprising:

executing at least one selected script from a plurality of scripts, each script configured for specifying parameters for a prescribed sequence of requests for the voice web application;

outputting, to the application server via the HTTP connection, the prescribed sequence of requests based on execution of the corresponding selected one script; and receiving a Hypertext Markup Language (HTML) request for execution of the at least one selected script, the executing step executing the at least one selected script based on the received HTML request;

wherein the executing step includes executing a prescribed number of instances of the at least one selected script based on a corresponding prescribed instance number;

wherein the step of executing a prescribed number of instances includes generating, for each instance, a request parameter for at least one of the requests based on a corresponding instance number.

2. The method of claim 1, wherein the step of executing a prescribed number of instances includes detecting the corresponding prescribed instance number from the HTML request.

3. The method of claim 2, wherein the receiving step includes receiving a Uniform Resource Locator (URL) address that specifies the at least one selected script and the prescribed number of instances.

4. The method of claim 4, wherein the receiving step includes receiving an HTML form that specifies the at least one selected script and the prescribed number of instances.

5. The method of claim 1, wherein the scripts are stored on a storage medium locally accessible by the application server, the method further comprising accessing the at least one selected script according to a prescribed I/O protocol for execution.

6. The method of claim 1, wherein the step of generating the request parameter includes incrementing the request parameter relative to an execution iteration for the corresponding instance and based on a prescribed increment range.

7. The method of claim 6, wherein the step of generating the request parameter further includes resetting the request parameter to a prescribed initial value based on the execution iteration for the corresponding instance reaching the prescribed increment range.

8. A method in an executable system for testing an application server configured for executing a voice web application by sending responses to requests via a Hypertext Transport Protocol (HTTP) connection, the method comprising:

executing at least one selected script from a plurality of scripts, each script configured for specifying parameters for a prescribed sequence of requests for the voice web application;

outputting, to the application server via the HTTP connection, the prescribed sequence of requests based on execution of the corresponding selected one script, and receiving a Hypertext Markup Language (HTML) request for execution of the at least one selected script, the executing step executing the at least one selected script based on the received HTML request;

wherein the executing step includes executing a prescribed number of instances of the at least one selected script based on a corresponding prescribed instance number;

wherein the step of executing a prescribed number of instances includes:

repeating an iteration of executing the at least one selected script by each of the instances for a prescribed interval; and selectively incrementing a selected request parameter based on repeating the corresponding iteration for the corresponding instance.

9. The method of claim 8, wherein the selectively incrementing step includes resetting the selected request parameter to an initial prescribed value based on the corresponding iteration reaching a prescribed increment range.

10. A method in an executable system for testing an application server configured for executing a voice web application by sending responses to requests via a Hypertext Transport Protocol (HTTP) connection, the method comprising:

executing at least one selected script from a plurality of scripts each script configured for specifying parameters for a prescribed sequence of requests for the voice web application; and outputting, to the application server via the HTTP connection, the prescribed sequence of requests based on execution of the corresponding selected one script;

wherein the executing step includes executing, by a prescribed number of instances, a selected group of the scripts in a prescribed order for a prescribed number of iterations, the prescribed order representing a sequence of application operation requests between the executable system and the application server.

11. The method of claim 10, wherein the step of executing the selected group of the scripts in a prescribed order includes:

incrementing for each said instance a first selected request parameter based on a corresponding instance number; and selectively incrementing within each instance iteration a second selected request parameter based on the corresponding instance number and the corresponding instance iteration relative to a prescribed increment range.

12. The method of claim 10, wherein the step of executing the selected group of the scripts in a prescribed order includes:

generating in a first selected script a first prescribed sequence of requests for storing a prescribed media file by the application server; and generating in a second selected script a second prescribed sequence of requests for receiving the prescribed media file from the application server in an HTML page having an HTML tag and at least one extensible markup language (XML) element defining data for an playback of the prescribed media file.

13. The method of claim 12, further comprising:

monitoring metrics identifying performance by the application server in sending a plurality of the HTML pages, each having at least one XML element, as respective responses to the requests during at least a portion of the prescribed number of iterations; and periodically storing statistics of the metrics during execution of the scripts.

14. The method of claim 13, further comprising storing a log entry for the testing of the application server in response to a selected one of the statistics reaching a prescribed threshold.

15. The method of claim 10, wherein the outputting step includes:

receiving from the application server a first response corresponding to one of the requests, the response including a hypertext markup language (HTML) page having an HTML tag and at least one extensible markup language (XML) element defining data for an audio operation to be performed by an executable media resource; and outputting a subsequent one of the requests based on reception of the first response.

16. The method of claim 15, further comprising periodically storing statistics indicating performance of the application server in generating the respective responses to the requests.

17. A system configured for testing an application server configured for executing a voice web application, the system including:

a storage medium for storing scripts, each script configured for specifying parameters for a prescribed sequence of requests for the voice web application; and an executable runtime environment configured for selectively executing at least one of the scripts, the executable runtime environment outputting, to the application server via a Hypertext Transport Protocol (HTTP) connection, the prescribed sequence of requests based on execution of the corresponding selected one script;

wherein the executable runtime environment is configured for concurrently executing a prescribed number of instances for execution of said at least one of the scripts, the executable runtime environment configured for repeating an iteration of executing the at least one selected script in each corresponding instance for a prescribed interval.

18. The system of claim 17, further comprising an HTTP-based user interface configured for receiving a user request that specifies the selected script, the prescribed number of instances, and the prescribed interval.

19. The system of claim 17, wherein the executable runtime environment is configured for selectively incrementing within each instance a first request parameter for at least one of the requests based on a corresponding instance number, the executable runtime environment also configured for selectively incrementing, within each said iteration of the corresponding instance, a second request parameter relative to the iteration for the corresponding instance and based on a prescribed increment range.

20. A computer readable medium having stored thereon sequences of instructions for testing an application server configured for executing a voice web application by sending responses to requests via a Hypertext Transport Protocol (HTTP) connection, the sequences of instructions including instructions for performing the steps of:

executing at least one selected script from a plurality of scripts, each script configured for specifying parameters for a prescribed sequence of requests for the voice web application; and outputting, to the application server via the HTTP connection the prescribed sequence of requests based on execution of the corresponding selected one script; and receiving a Hypertext Markup Language (HTML) request for execution of the at least one selected script, the executing step executing the at least one selected script based on the received HTML request, wherein the executing step includes executing a prescribed number of instances of the at least one selected script based on a corresponding prescribed instance number;

wherein the step of executing a prescribed number of instances includes generating, for each instance, a request parameter for at least one of the requests based on a corresponding instance number.

21. The medium of claim 20, wherein the step of executing a prescribed number of instances includes detecting the corresponding prescribed instance number from the HTML request.

22. The medium of claim 21, wherein the receiving step includes receiving a Uniform Resource Locator (URL) address that specifies the at least one selected script and the prescribed number of instances.

23. The medium of claim 21, wherein the receiving step includes receiving an HTML form that specifies the at least one selected script and the prescribed number of instances.

24. The medium of claim 20, wherein the scripts are stored on a storage medium locally accessible by the application server, the medium further comprising instructions for performing the step of accessing the at least one selected script according to a prescribed I/O protocol for execution.

25. The medium of claim 20, wherein the step of generating the request parameter includes incrementing the request parameter relative to an execution iteration for the corresponding instance and based on a prescribed increment range.

26. The medium of claim 25, wherein the step of generating the request parameter further includes resetting the request parameter to a prescribed initial value based on the execution iteration for the corresponding instance reaching the prescribed increment range.

27. A computer readable medium having stored thereon sequences of instructions for testing an application server configured for executing a voice web application by sending responses to requests via a Hypertext Transport Protocol (HTTP) connection, the sequences of instructions including instructions for performing the steps of:

executing at least one selected script from a plurality of scripts, each script configured for specifying parameters for a prescribed sequence of requests for the voice web application; and outputting, to the application server via the HTTP connection, the prescribed sequence of requests based on execution of the corresponding selected one script; and receiving a Hypertext Markup Language (HTML) request for execution of the at least one selected script, the executing step executing the at least one selected script based on the received HTML request;

wherein the executing step includes executing a prescribed number of instances of the at least one selected script based on a corresponding prescribed instance number;

wherein the step of executing a prescribed number of instances includes:

repeating an iteration of executing the at least one selected script by each of the instances for a prescribed interval; and selectively incrementing a selected request parameter based on repeating the corresponding iteration for the corresponding instance.

28. The medium of claim 27, wherein the selectively incrementing step includes resetting the selected request parameter to an initial prescribed value based on the corresponding iteration reaching a prescribed increment range.

29. A computer readable medium having stored thereon sequences of instructions for testing an application server configured for executing a voice web application by sending responses to requests via a Hypertext Transport Protocol (HTTP) connection, the sequences of instructions including instructions for performing the steps of:

executing at least one selected script from a plurality of scripts, each script configured for specifying parameters for a prescribed sequence of requests for the voice web application; and outputting, to the application server via the HTTP connection, the prescribed sequence of requests based on execution of the corresponding selected one script;

wherein the executing step includes executing, by a prescribed number of instances, a selected group of the scripts in a prescribed order for a prescribed number of iterations, the prescribed order representing a sequence of application operation requests between the executable system and the application server.

30. The medium of claim 29, wherein the step of executing the selected group of the scripts in a prescribed order includes:

incrementing for each said instance a first selected request parameter based on a corresponding instance number; and selectively incrementing within each instance iteration a second selected request parameter based on the corresponding instance number and the corresponding instance iteration relative to a prescribed increment range.

31. The medium of claim 29, wherein the step of executing the selected group of the scripts in a prescribed order includes:

generating in a first selected script a first prescribed sequence of requests for storing a prescribed media file by the application server; and generating in a second selected script a second prescribed sequence of requests for receiving the prescribed media file from the application server in an HTML page having an HTML tag and at least one extensible markup language (XML) element defining data for an playback of the prescribed media file.

32. The medium of claim 31, further comprising instructions for performing the steps of:

monitoring metrics identifying performance by the application server in sending a plurality of the HTML pages, each having at least one XML element, as respective responses to the requests during at least a portion of the prescribed number of iterations; and periodically storing statistics of the metrics during execution of the scripts.

33. The medium of claim 32, further comprising instructions for performing the step of storing a log entry for the testing of the application server in response to a selected one of the statistics reaching a prescribed threshold.

34. The medium of claim 29, wherein the outputting step includes:

receiving from the application server a first response corresponding to one of the requests, the response including a hypertext markup language (HTML) page having an HTML tag and at least one extensible markup language (XML) element defining data for an audio operation to be performed by an executable media resource; and outputting a subsequent one of the requests based on reception of the first response.

35. The medium of claim 34, further comprising instructions for performing the step of periodically storing statistics indicating performance of the application server in generating the respective responses to the requests.

* * * * *

UNITED STATES PATENT AND TRADEMARK OFFICE
CERTIFICATE OF CORRECTION

PATENT NO. : 6,697,964 B1 Page 1 of 1
DATED : February 24, 2004
INVENTOR(S) : Dodrill et al.

It is certified that error appears in the above-identified patent and that said Letters Patent is hereby corrected as shown below:

<u>Column 11,</u>
Line 53, delete "4" and insert -- 2 -- therefor.

Signed and Sealed this

Eleventh Day of May, 2004

JON W. DUDAS
*Acting Director of the United States Patent and Trademark Office*